US012780142B1

(12) United States Patent
Choi

(10) Patent No.: US 12,780,142 B1
(45) Date of Patent: Nov. 3, 2026

(54) VEHICLE AIRBAG WITH AUXILIARY CHAMBER FOR AVOIDING OBSTACLE INTERFERENCE

(71) Applicants: Hyundai Motor Company, Seoul (KR); Kia Corporation, Seoul (KR)

(72) Inventor: Jun Yeol Choi, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 19/325,209

(22) Filed: Sep. 10, 2025

(30) Foreign Application Priority Data

May 14, 2025 (KR) ........................ 10-2025-0062737

(51) Int. Cl.
*B60R 21/233* (2006.01)

(52) U.S. Cl.
CPC .. *B60R 21/233* (2013.01); *B60R 2021/23308* (2013.01); *B60R 2021/23324* (2013.01)

(58) Field of Classification Search
CPC ........ B60R 21/233; B60R 2021/23308; B60R 2021/23324
See application file for complete search history.

(56) References Cited

U.S. PATENT DOCUMENTS 5,308,113 A * 5/1994 Moriset ............... B60R 21/2338 280/743.2
6,431,583 B1 * 8/2002 Schneider ............ B60R 21/216 280/743.2
6,846,008 B2 * 1/2005 Kamiji .................. B60R 21/231 280/729
8,226,118 B2 * 7/2012 Rose ................... B60R 21/2338 280/743.2
9,199,602 B1 * 12/2015 Fischer ................. B60R 21/239
11,242,026 B2 * 2/2022 Rosenberg ............ B60R 21/203
11,299,123 B2 * 4/2022 Park ...................... B60R 21/231
11,529,922 B2 * 12/2022 Mihm .................... B60R 21/205
11,697,386 B1 * 7/2023 Gould ................... B60R 21/231 280/728.3
11,865,991 B1 * 1/2024 Schneider ......... B60R 21/23138
12,208,765 B1 * 1/2025 Jaradi ............... B60R 21/23138
12,269,413 B1 * 4/2025 Taylor ................. B60R 21/2338
12,358,453 B2 * 7/2025 Watanabe ............. B60R 21/231
2001/0033072 A1 * 10/2001 Kumagai ............ B60R 21/2338 280/743.1

(Continued)

FOREIGN PATENT DOCUMENTS

CN 111660991 A * 9/2020 ........... B60R 21/239

OTHER PUBLICATIONS

Translation of CN 111660991 A (Year: 2020).*

*Primary Examiner* — Jason D Shanske
*Assistant Examiner* — Shams Dhanani
(74) *Attorney, Agent, or Firm* — Fox Rothschild LLP

(57) ABSTRACT

Provided is an airbag featuring a main chamber that deploys from a vehicle structure toward a passenger, forming a groove-shaped avoidance space to clear a protruding obstacle. An auxiliary chamber deploys in to this space between the obstacle and main chamber. A diaphragm panel, attached to the main chamber's inner surface, covers holes and allows gas flow once tension breaks a temporary attachment. A connecting rope links the panel to the chamber's front, pulling it open during deployment to enable sequenced inflation and fill the space effectively.

19 Claims, 10 Drawing Sheets

(56) References Cited

U.S. PATENT DOCUMENTS

| | | | | | |
|---|---|---|---|---|---|
| 2001/0035637 | A1* | 11/2001 | Thomas | B60R 21/233 | 280/736 |
| 2001/0040368 | A1* | 11/2001 | Okada | B60R 21/233 | 280/743.2 |
| 2004/0012179 | A1* | 1/2004 | Pinsenschaum | B60R 21/239 | 280/739 |
| 2004/0104564 | A1* | 6/2004 | Hawthorn | B60R 21/233 | 280/743.2 |
| 2004/0119271 | A1* | 6/2004 | Webber | B60R 21/2338 | 280/743.1 |
| 2004/0135352 | A1* | 7/2004 | Igawa | B60R 21/276 | 280/739 |
| 2005/0023811 | A1* | 2/2005 | Thomas | B60R 21/21 | 280/736 |
| 2005/0029781 | A1* | 2/2005 | Enders | B60R 21/205 | 280/732 |
| 2005/0035578 | A1* | 2/2005 | Arwood | B60R 21/26 | 280/732 |
| 2005/0052008 | A1* | 3/2005 | Rose | B60R 21/2346 | 280/740 |
| 2005/0167958 | A1* | 8/2005 | Okada | B60R 21/233 | 280/732 |
| 2005/0248137 | A1* | 11/2005 | Delventhal | B60R 21/2338 | 280/739 |
| 2006/0197327 | A1* | 9/2006 | Maripudi | B60R 21/2346 | 280/730.2 |
| 2007/0024036 | A1* | 2/2007 | Song | B60R 21/206 | 280/732 |
| 2007/0052222 | A1* | 3/2007 | Higuchi | B60R 21/2346 | 280/736 |
| 2007/0080530 | A1* | 4/2007 | Issler | B60R 21/233 | 280/739 |
| 2007/0182144 | A1* | 8/2007 | Aranzulla | B60R 21/233 | 280/743.2 |
| 2007/0205590 | A1* | 9/2007 | Klinkenberger | B60R 21/2338 | 280/743.2 |
| 2007/0210565 | A1* | 9/2007 | Song | B60R 21/261 | 280/732 |
| 2008/0067795 | A1* | 3/2008 | Johansson | B60R 21/233 | 280/736 |
| 2008/0174094 | A1* | 7/2008 | Bito | B60R 21/2338 | 280/739 |
| 2008/0315567 | A1* | 12/2008 | Fischer | B60R 21/233 | 280/736 |
| 2009/0033081 | A1* | 2/2009 | Flischer | B60R 21/239 | 280/743.2 |
| 2009/0115176 | A1* | 5/2009 | Reiter | B60R 21/233 | 280/743.2 |
| 2009/0121462 | A1* | 5/2009 | Rick | B60R 21/206 | 280/729 |
| 2009/0194981 | A1* | 8/2009 | Mendez | B60R 21/233 | 280/732 |
| 2009/0212539 | A1* | 8/2009 | Honda | B60R 21/261 | 280/729 |
| 2009/0218796 | A1* | 9/2009 | Webber | B60R 21/233 | 280/740 |
| 2010/0133792 | A1* | 6/2010 | Agren | B60R 21/233 | 280/729 |
| 2010/0201107 | A1* | 8/2010 | Abe | B60R 21/2338 | 280/739 |
| 2010/0244419 | A1* | 9/2010 | Maripudi | B60R 21/261 | 280/743.2 |
| 2011/0031723 | A1* | 2/2011 | Fischer | B60R 21/233 | 280/743.2 |
| 2011/0140398 | A1* | 6/2011 | Song | B60R 21/205 | 280/729 |
| 2011/0140401 | A1* | 6/2011 | Fischer | B60R 21/239 | 280/743.1 |
| 2011/0198828 | A1* | 8/2011 | Fischer | B60R 21/239 | 280/743.2 |
| 2012/0025497 | A1* | 2/2012 | Yoo | B60R 21/233 | 280/729 |
| 2012/0074677 | A1* | 3/2012 | Hiruta | B60R 21/2338 | 280/739 |
| 2012/0306187 | A1* | 12/2012 | Mendez | B60R 21/239 | 280/743.2 |
| 2013/0320656 | A1* | 12/2013 | Yamada | B60R 21/2338 | 280/743.2 |
| 2014/0265281 | A1* | 9/2014 | Witt, Jr. | B60R 21/2338 | 280/743.2 |
| 2016/0046257 | A1* | 2/2016 | Yamada | B60R 21/233 | 280/729 |
| 2016/0280176 | A1* | 9/2016 | Yamada | B60R 21/205 | |
| 2017/0072892 | A1* | 3/2017 | Wang | B60R 21/205 | |
| 2017/0101071 | A1* | 4/2017 | Kruse | B60R 21/2338 | |
| 2018/0015902 | A1* | 1/2018 | Maenishi | B60R 21/205 | |
| 2018/0022307 | A1* | 1/2018 | Zauritz | B60R 21/231 | 280/743.2 |
| 2018/0154856 | A1* | 6/2018 | Yamada | B60R 21/231 | |
| 2019/0054887 | A1* | 2/2019 | Castillo Jaime | B60R 21/231 | |
| 2019/0092268 | A1* | 3/2019 | Ishida | B60R 21/205 | |
| 2019/0106076 | A1* | 4/2019 | Shin | B60R 21/232 | |
| 2019/0210554 | A1* | 7/2019 | Williams | B60R 21/239 | |
| 2020/0156583 | A1* | 5/2020 | Yamada | B60R 21/205 | |
| 2020/0247350 | A1* | 8/2020 | Hosoe | B60R 21/235 | |
| 2021/0024028 | A1* | 1/2021 | Kanegae | B60R 21/01552 | |
| 2021/0046893 | A1* | 2/2021 | Rosenberg | B60R 21/013 | |
| 2021/0122318 | A1* | 4/2021 | Yoo | B60R 21/23138 | |
| 2021/0162942 | A1* | 6/2021 | Kobayashi | B60R 21/233 | |
| 2021/0261086 | A1* | 8/2021 | Kobayashi | B60R 21/239 | |
| 2023/0391286 | A1* | 12/2023 | Chavez | B60R 21/231 | |
| 2024/0181985 | A1* | 6/2024 | Kim | B60R 21/264 | |
| 2024/0190378 | A1* | 6/2024 | Mashiko | B60R 21/233 | |
| 2024/0239291 | A1* | 7/2024 | Freisler | B60N 3/001 | |
| 2025/0100497 | A1* | 3/2025 | Maier | B60R 21/23184 | |
| 2025/0368157 | A1* | 12/2025 | Lee | B60R 21/233 | |

* cited by examiner

VEHICLE AIRBAG WITH AUXILIARY CHAMBER FOR AVOIDING OBSTACLE INTERFERENCE

CROSS-REFERENCE TO RELATED APPLICATION(S)

This application is based on and claims under 35 U.S.C. 119 the benefit of Korean Patent Application No. 10-2025-0062737, filed on May 14, 2025, in the Korean Intellectual Property Office, the disclosure of which is herein incorporated by reference in its entirety.

BACKGROUND

Technical Field

An embodiment disclosed herein relates to an airbag that is capable of being deployed while avoiding interference with a protruding audio, video, and navigation unit ("AVN"), and that satisfies crash performance and low-risk deployment ("LRD") performance.

Background

When a large AVN is protruding from the crash pad, interference may occur between the AVN and the airbag cushion during deployment of the passenger-side airbag.

As a result, the cushion may fail to fully deploy, or it may become difficult to ensure the stability of the airbag deployment.

The foregoing description of the background art is intended merely to aid in the understanding of the background of embodiments set forth herein, and should not be construed as meaning that the embodiments fall within the purview of the related art already known to those skilled in the art.

SUMMARY OF THE DISCLOSURE

An embodiment disclosed herein provides an airbag that allows deployment of the cushion while avoiding interference with a protruding AVN, and that satisfies crash performance and LRD performance.

The technical subjects pursued in embodiments set forth herein may not be limited to the above-mentioned technical subjects, and other technical subjects which are not mentioned herein may be clearly understood from the following description by those skilled in the art to which the embodiments pertain.

In view of the foregoing, an air bag according to an embodiment disclosed herein may include: a main chamber configured to deploy from a structure of a vehicle facing a seat toward a passenger seated on the seat and to define an avoidance space in a shape extending over an obstacle protruding upward from the structure; and an auxiliary chamber configured to deploy between the obstacle and the main chamber within the avoidance space.

The avoidance space may be formed in a groove shape with a portion of the lower portion of the main chamber opened and may be configured to have a clearance above and behind the obstacle.

The auxiliary chamber may be connected to an inner surface of the avoidance space facing the obstacle to be deployed toward the obstacle.

The obstacle may be positioned in an inner front portion of the avoidance space, which is close to the deployment point of the main chamber, and the auxiliary chamber may be configured to be deployed toward the obstacle from an inner rear portion of the avoidance space, which is close to the passenger.

The auxiliary chamber may be configured to be deployed in a shape configured to fill the avoidance space formed between the obstacle and the main chamber.

The auxiliary chamber may be folded on the inner surface of the avoidance space to be deployed with a delay.

The main chamber and the auxiliary chamber may be in fluid communication with each other, so that the gas filled in the main chamber flows into the auxiliary chamber.

A diaphragm panel may be connected to an inner surface of the main chamber in a shape covering the chamber holes through which the main chamber and the auxiliary chamber are in fluid communication with each other, and a connecting rope may be connected between the inner surface of the main chamber facing the passenger and the diaphragm panel so as to allow the chamber holes to open by tension generated in the connecting rope.

The diaphragm panel may include a panel hole so as to allow the gas in the main chamber to pass through the panel hole and to flow into the chamber holes.

The panel holes may be formed at positions that do not overlap the chamber holes.

The diaphragm panel may be temporarily attached in a folded state to the inner surface of the main chamber, and the temporarily attached portion may be configured to be broken by tension generated in the connecting rope.

The diaphragm panel may be temporarily attached to the main chamber and the auxiliary chamber.

According to an embodiment disclosed herein, the avoidance space is formed in the main chamber where the protruding AVN is positioned so as to accommodate the AVN, allowing the main chamber to be deployed without interfering with the AVN, and enabling the cushion to be deployed while avoiding interference with the AVN.

In addition, since the auxiliary chamber is deployed while filling the space between the AVN and the main chamber within the avoidance space, the main chamber and the auxiliary chamber form an integrated chamber, satisfying the vehicle's crash performance and providing safe protection for the passenger.

In some embodiments, an airbag includes a main chamber configured to deploy from a structure of a vehicle toward a passenger seated on a seat of the vehicle; an auxiliary chamber configured to deploy between an obstacle protruding upward from the structure and the main chamber within an avoidance space; a diaphragm panel connected to an inner surface of the main chamber and covering a plurality of chamber holes that place the main chamber and the auxiliary chamber in fluid communication with each other; and a connecting rope connected between the inner surface of the main chamber facing the passenger and the diaphragm panel, the connecting rope being tensioned by gas pressure generated inside the main chamber during deployment of the main chamber so as to separate the diaphragm panel from the inner surface and thereby expose the chamber holes and allow inflation gas in the main chamber to flow into the auxiliary chamber after an initial stage of airbag deployment.

One end of the connecting rope may be fixed to the diaphragm panel, and an opposite end of the connecting rope may be fixed to the inner surface of the amin chamber facing the passenger.

Tension in the connecting rope may be generated by internal gas pressure of the main chamber during deployment of the main chamber.

The connecting rope may be oriented so as to pull the diaphragm panel toward the passenger when the tension is generated.

The connecting rope may separate the diaphragm panel from the inner surface of the main chamber to create a gap through which the gas inside the main chamber flows into the auxiliary chamber.

The connecting rope may be configured to apply a force of at least a predetermined level that breaks a temporary attachment portion that temporarily secures the diaphragm panel to the main chamber.

The diaphragm panel may be temporarily attached in a folded state on the inner surface of the main chamber, and the connecting rope may pull the diaphragm panel out of the folded state when the predetermined force is reached.

After the diaphragm panel is separated from the inner surface by the connecting rope, panel holes formed in the diaphragm panel may be spaced apart from the inner surface so that gas passes through the panel holes and the chamber holes and flows into auxiliary chamber.

As discussed, the method and system suitably include use of a controller or processer.

In another embodiment, vehicles are provided that comprise an apparatus as disclosed herein.

Advantageous effects obtainable from embodiments set forth herein may not be limited to the above-mentioned effects, and other effects which are not mentioned herein may be clearly understood from the following description by those skilled in the art to which the embodiments pertain.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Figure 1:
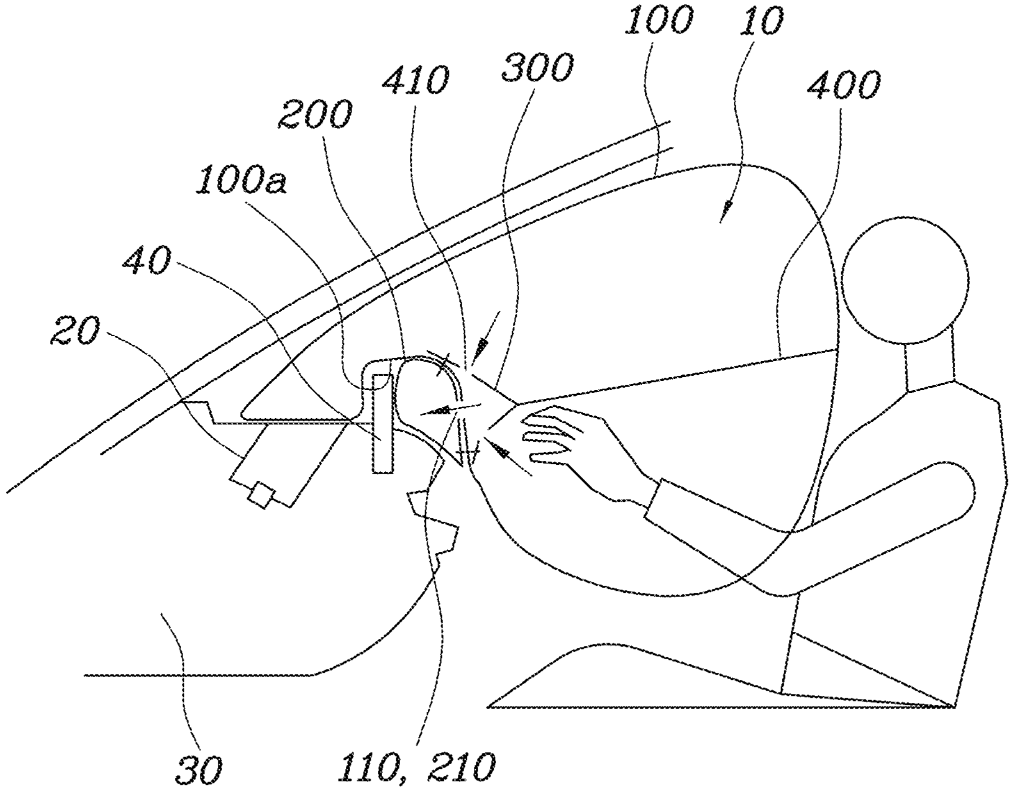
FIG. 1 is a view illustrating a deployed state of an airbag according to some embodiments disclosed herein.

In describing the embodiments set forth herein, a detailed description of known functions or configurations incorporated herein will be omitted when it is determined that the description may make the subject matter of the embodiments set forth herein unclear. In addition, it should be appreciated that the accompanying drawings are provided only for the sake of easy understanding of the embodiments set forth herein, and the technical idea of the present disclosure is not limited to the accompanying drawings and includes all modifications, equivalents, or alternatives falling within the spirit and scope of the present disclosure. The following descriptions are not intended to limit the present disclosure to the described form or specific field, and it is considered that various alternative modifications and changes may be made to the present disclosure regardless of whether the descriptions are explicit or implicit. Those skilled in the art to which the present disclosure pertains will appreciate that the contents of the present disclosure may be changed in forms and details.

The present disclosure will be described with reference to particular embodiments. However, as understood by a person ordinarily skilled in the art to which the present disclosure pertains, the various aspects set forth herein may be modified or implemented otherwise in different ways without departing from the spirit and scope of the present disclosure. Accordingly, the following description is to be considered illustrative and is intended to teach those skilled in the art to which the present disclosure pertains how to make and use various embodiments. It will be appreciated that the forms of the present disclosure illustrated and described herein are to be taken as exemplary embodiments. Equivalent elements, materials, processes, or steps may be substituted for those exemplified and described in the present disclosure. As used in the present disclosure, such expressions as “including,” “comprising,” “incorporating,” “consisting of,” “have,” or “is” should be interpreted in a non-exclusive manner, that is, interpreted to allow for the inclusion of items, components, or elements not explicitly enumerated. In addition, references to the singular form should be interpreted to include the plural form as well.

It is understood that the term “vehicle” or “vehicular” or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Furthermore, various embodiments set forth herein should be regarded as illustrative and descriptive and should not be construed as limiting the details of the present disclosure. All references to joining (e.g., attached, affixed, coupled, and connected) are used only to facilitate understanding of the present disclosure, and are not intended to limit the position, orientation, or use of any component set forth herein. Accordingly, references to joining should be interpreted broadly, if any. Moreover, these references to joining do not imply that two or more elements are connected directly to each other. Additionally, all numerical terms, such as “first,” “second,” “third,” “primary,” “secondary,” “main,” or any other generic terms or numerical expressions, are to be understood solely as identifiers to aid in the understanding of the various components, embodiments, modifications, or variations of the present disclosure, and do not imply any limitations as to any component, embodiment, modification, variation, or their order or preference. That is, these terms may be used to describe various elements, but the elements are not limited by the terms. The above terms are used merely for the purpose of distinguishing one element from other elements.

The terms "module" and "unit" used for the elements in the following description are given or interchangeably used in consideration of only the ease of writing the specification, and do not have distinct meanings or roles by themselves.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules, and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

In the case where an element is referred to as being "connected" or "coupled" to any other elements, it should be understood that not only the element may be directly connected or coupled to the other elements, but also another element may exist therebetween. Contrarily, in the case where an element is referred to as being "directly connected" or "directly coupled" to any other element, it should be understood that no other element exists therebetween.

In addition, a unit or a control unit included in names is merely a term widely used for naming a controller configured to control a specific function of a vehicle but does not mean a generic function unit.

In order to control functions in charge, a controller may include a communication device configured to communicate with a sensor or another controller, a memory configured to store an operating system or logic instructions and input/output information, and at least one processor configured to perform determination, calculation, decision, or the like required for control of the functions in charge.

Any number or variety of components in any of the configurations set forth herein may fall within the scope of the present disclosure set forth herein. The components may include any combination of the features set forth herein and may be arranged in any of the various configurations set forth herein. The concepts related to the uses and operations of the components of the present disclosure, as well as their structures and arrangements, may be applied to any number of embodiments in any combination, as well as to the particular embodiments discussed herein. Embodiments including those having various features in various arrangements are described below with reference to the drawings.

The term "deployment point" herein refers to the location on the vehicle structure from which the airbag emerges during inflation.

The term "avoidance space" herein refers to a recessed grove in the main chamber configured to provide clearance around a protruding obstacle to prevent interference during deployment.

The term "diaphragm panel" herein refers to a flexible partition connected between the main chamber and the auxiliary chamber, covering openings to control and delay gas flow until tension is applied.

The term "connecting rope" herein refers to a tether or strap attached between the diaphragm panel and a portion of the main chamber, designed to tauten during deployment to break a temporary attachment and enable gas flow. C Hereinafter, various embodiments set forth herein will be described in detail with reference to the accompanying drawings, and the same or similar elements are given the same and similar reference numerals regardless of figure numbers, so duplicate descriptions thereof will be omitted.

An airbag according to the present disclosure includes: a main chamber 100 configured to be deployed from a structure (or crash pad) 30 of a vehicle facing a seat toward a passenger seated on the seat and to define an avoidance space 100*a* in a shape extending over an obstacle (or AVN) 40 protruding upward from the structure 30; and an auxiliary chamber 200 configured to deploy between the obstacle 40 and the main chamber 100 within the avoidance space 100*a*.

An embodiment of the present disclosure may be applied to an airbag that deploys toward a passenger seated on a passenger seat from the front of the passenger seat in a vehicle.

Figure 2:
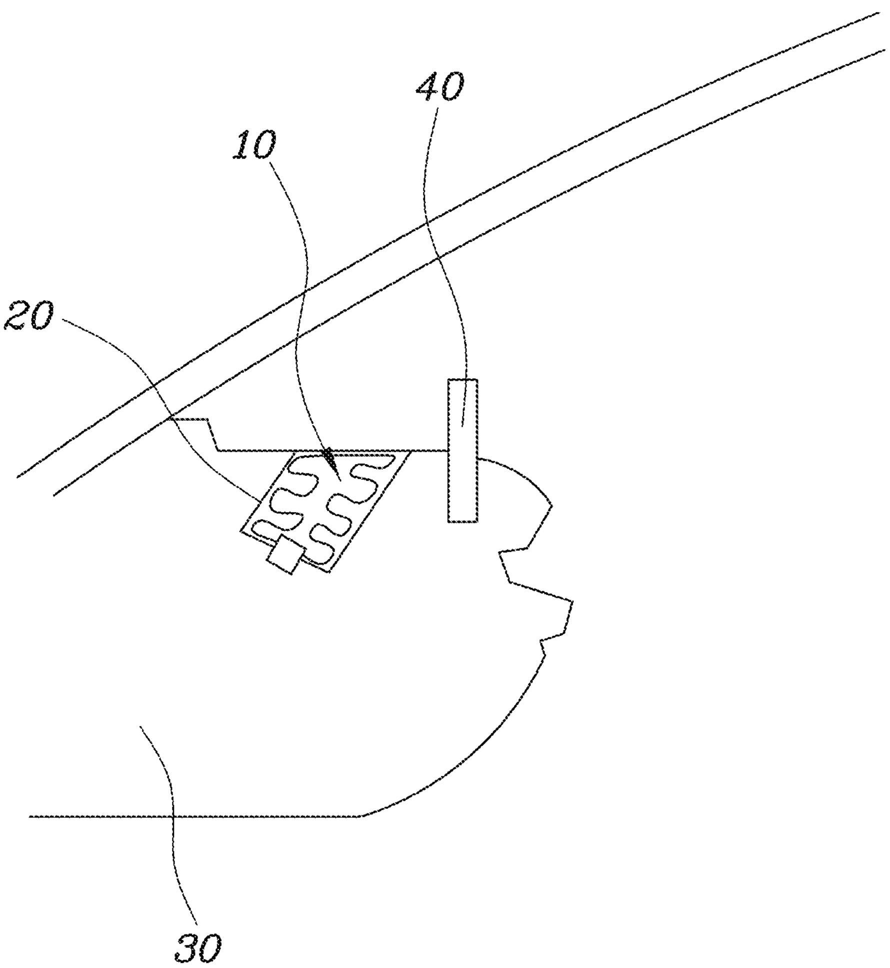
FIG. 2 is a view illustrating a state in which the airbag according to some embodiments disclosed herein is embedded in a crash pad.

Referring to FIGS. 1 and 2, a structure 30 including a cockpit or a crash pad is installed at the front inside a vehicle, and an airbag housing 20 may be embedded in an upper inner portion of the structure 30.

A cushion 10 may be stored in a folded state inside the airbag housing 20, and an inflator serving as a gas supply device may be provided at a lower portion of the airbag housing 20. Accordingly, the inflator is connected to the cushion 10 to supply gas into the cushion 10, and the cushion 10 expands and deploys toward the passenger while covering the structure 30.

At this time, the airbag housing 20 is inclined upward toward the front seat passenger, so as to allow the cushion 10 to deploy from the airbag housing 20 while avoiding interference with the windshield.

The structure 30 includes an obstacle 40 that protrudes upward, and the obstacle 40 is positioned in a direction toward the passenger at the position where the airbag housing 20 is embedded.

The obstacle 40 may be a display device, such as a large AVN.

In particular, the cushion 10 configured to be deployed from the airbag housing 20 includes a main chamber 100 and an auxiliary chamber 200, and the main chamber 100 is deployed toward the front seat passenger.

However, since the obstacle 40 protrudes between the airbag housing 20 and the front passenger, the main chamber 100 needs to be deployed while avoiding the obstacle 40.

To this end, an avoidance space 100*a* is formed at a lower portion of the main chamber 100, which is positioned over the obstacle 40, and the avoidance space 100*a* is shaped to extend over the obstacle 40 from the front end of the obstacle 40. As a result, the obstacle 40 is accommodated within the avoidance space 100*a*, allowing the main chamber 100 to deploy without interfering with the obstacle 40.

In addition, the auxiliary chamber 200 is deployed within the avoidance space 100*a*. In particular, the auxiliary chamber 200 is deployed while filling a space between the obstacle 40 and the main chamber 100, thereby allowing the main chamber 100 and the auxiliary chamber 200 to form an integrated chamber, supporting the passenger's load.

Accordingly, by deploying the cushion 10 while avoiding interference with the AVN 40 protruding from the crash pad 30, the deployment performance of the cushion 10 may be improved, and crash performance may be satisfied.

In addition, the avoidance space 100*a* may be formed in a groove shape with a portion of the lower portion of the main chamber 100 opened and may be configured to have a clearance above and behind the obstacle 40.

That is, as illustrated in FIG. 1, the avoidance space 100*a* is formed at an intermediate portion of the bottom surface of the main chamber 100 in a fully deployed state, and the avoidance space 100*a* is formed in a groove shape recessed upward, with the obstacle 40 positioned therein.

Accordingly, the internal height of the avoidance space 100*a* is greater than the height of the obstacle 40, so that a clearance is secured between the upper end of the obstacle 40 and the main chamber 100, thereby more reliably preventing interference between the main chamber 100 and the obstacle 40.

In particular, when the airbag is deployed while the passenger is seated abnormally, or when a small adult or child passenger is seated, the auxiliary chamber 200 may not be deployed.

Figure 10:
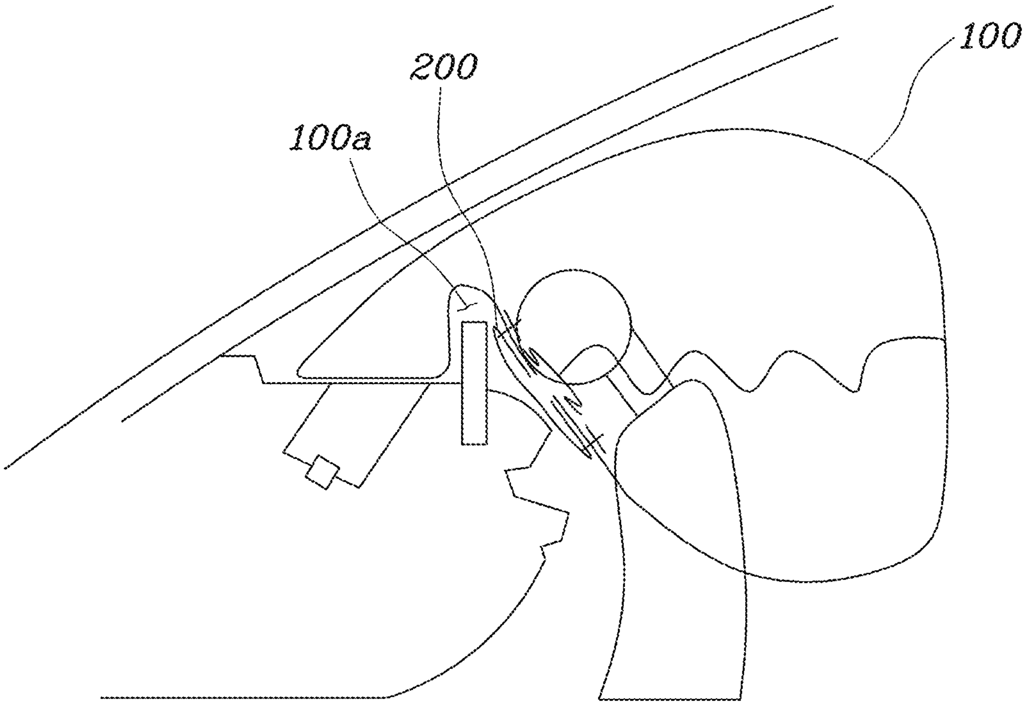
FIG. 10 is a view illustrating an operating state for implementing LRD performance through the airbag according to some embodiments disclosed herein.

In this case, as illustrated in FIG. 10, the longitudinal length of the avoidance space 100*a* is formed to be longer than the front-to-rear length of the obstacle 40, so that a clearance is secured between the rear end of the obstacle 40 and the main chamber 100. As a result, the main chamber 100 enters this clearance space, leading to a reduction in its internal pressure.

Accordingly, the space formed by the clearance functions as an LRD vent hole, thereby securing LRD performance and reducing injury to the passenger.

Meanwhile, in an embodiment disclosed herein, the auxiliary chamber 200 may be connected to an inner surface of the avoidance space 100*a* facing the obstacle 40 to be deployed toward the obstacle 40.

As an embodiment, the obstacle 40 may be positioned in an inner front portion of the avoidance space 100*a*, which is close to the deployment point of the main chamber 100, and the auxiliary chamber 200 may be deployed toward the obstacle 40 from an inner rear portion of the avoidance space 100*a*, which is close to the passenger.

Figure 3:
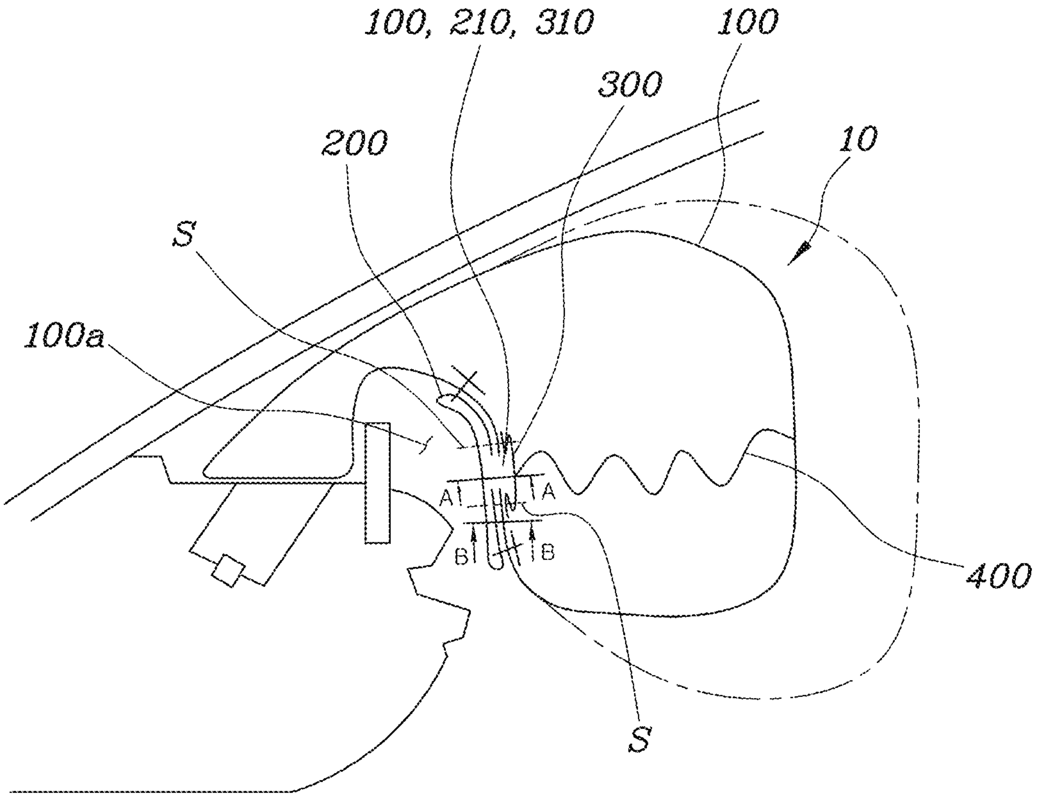
FIG. 3 is a view illustrating an initial deployment state of the airbag according to some embodiments disclosed herein.
Figure 6:
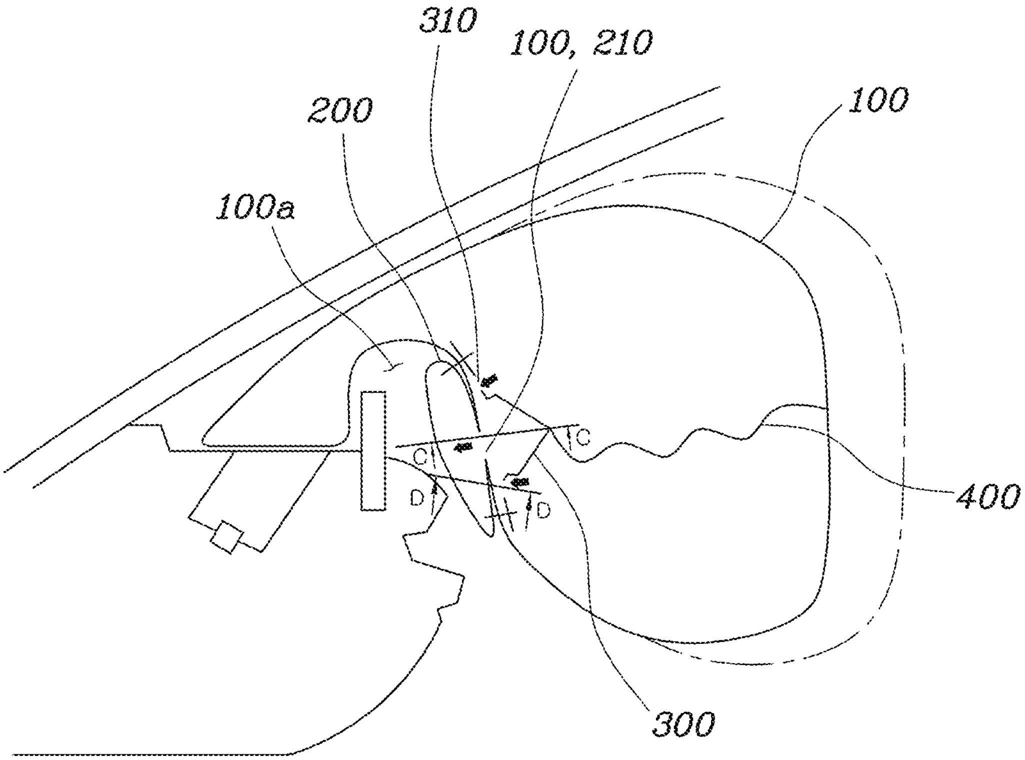
FIG. 6 is a view illustrating a deployment state in which the expansion amount increases after the initial deployment of the airbag shown in FIG. 3.
Figure 7:
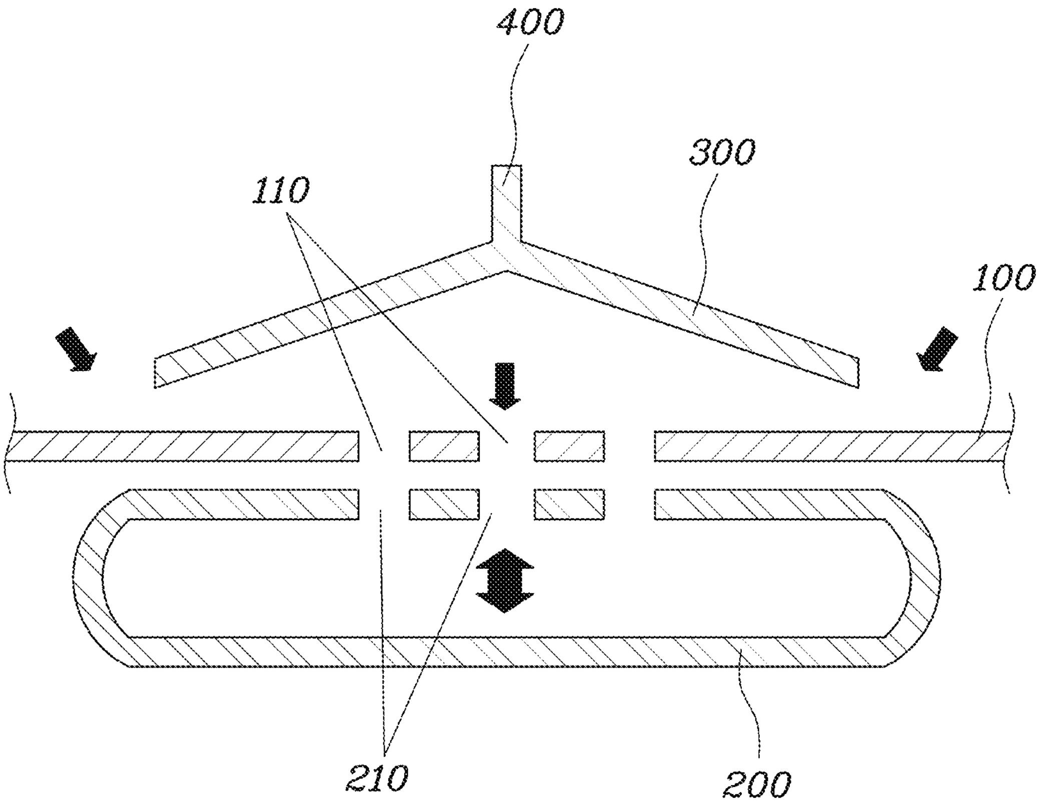
FIG. 7 is a cross-sectional view taken along line C-C in FIG. 6.

Referring to FIGS. 1, 3, and 6, the auxiliary chamber 200 is sewn and fixed to an inner surface of the avoidance space 100*a* on the passenger side.

Accordingly, when gas is introduced into the auxiliary chamber 200, the auxiliary chamber 200 expands toward the obstacle 40 and is deployed while filling the avoidance space 100*a* formed between the obstacle 40 and the main chamber 100.

Furthermore, the auxiliary chamber 200 may be deployed in a shape configured to fill the avoidance space 100*a* formed between the obstacle 40 and the main chamber 100.

That is, as the auxiliary chamber 200 is deployed in a shape corresponding to the avoidance space 100*a*, a front surface of the auxiliary chamber 200 is supported by the rear end of the obstacle 40, and a rear surface of the auxiliary chamber 200 is supported by the main chamber 100, which defines a rear inner surface of the avoidance space 100*a*.

Accordingly, since the auxiliary chamber 200 is supported between the main chamber 100 and the obstacle 40 within the avoidance space 100*a*, the auxiliary chamber 200 may be integrated with the main chamber 100 into a single chamber, thereby supporting the passenger.

In addition, in an embodiment disclosed herein, the auxiliary chamber 200 may be folded on the inner surface of the avoidance space 100*a* to be deployed with a delay.

Figure 4:
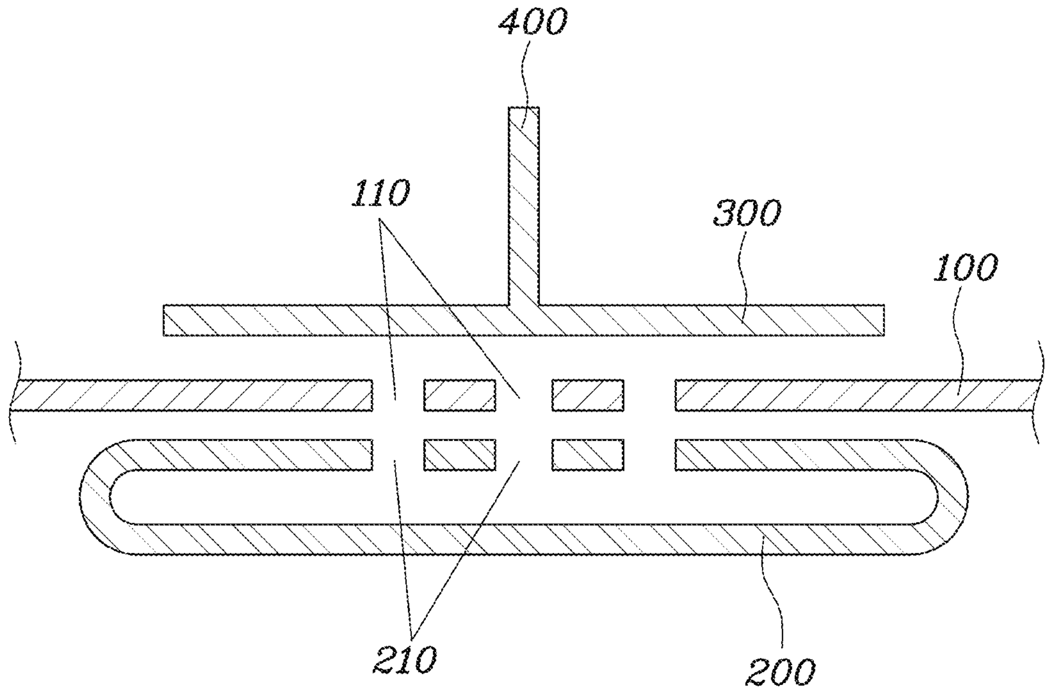
FIG. 4 is a cross-sectional view taken along line A-A in FIG. 3.
Figure 5:
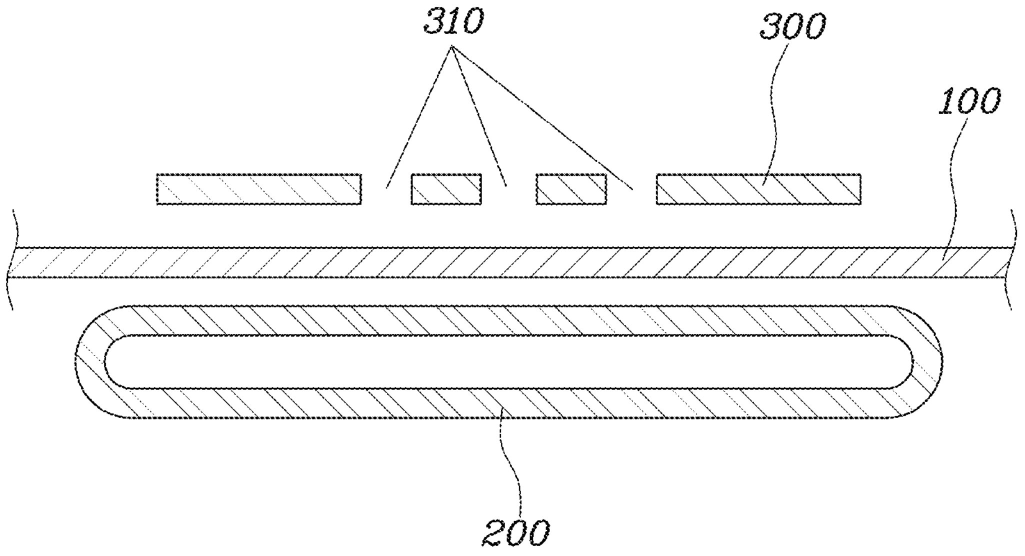
FIG. 5 is a cross-sectional view taken along line B-B in FIG. 3.

Referring to FIGS. 3 to 5, when a vehicle collision occurs, the airbag expands and deploys toward the passenger.

However, in the initial stage of the airbag deployment, the main chamber 100 is deployed while forming the shape of the avoidance space 100*a*, but the auxiliary chamber 200 remains folded on the inner surface of the avoidance space 100*a* and is not deployed.

Accordingly, since the auxiliary chamber 200 is deployed with a delay compared to the main chamber 100, the main chamber 100 may be deployed more rapidly, enabling earlier restraint of the passenger.

In addition, the main chamber 100 and the auxiliary chamber 200 may be in fluid communication with each other, so that the gas filled in the main chamber 100 may flow into the auxiliary chamber 200.

Referring to FIGS. 6 to 9, a main chamber hole 110 is formed in a portion of the main chamber 100 that overlaps the auxiliary chamber 200, and an auxiliary chamber hole 210 is formed in a portion of the auxiliary chamber 200 that overlaps the main chamber 100.

In particular, the main chamber 100 and the auxiliary chamber 200 are connected such that the main chamber hole 110 and the auxiliary chamber hole 210 are aligned, so that the main chamber 100 and the auxiliary chamber 200 are in fluid communication with each other.

Accordingly, when gas generated from the inflator begins to fill the main chamber 100, the gas filled in the main chamber 100 is introduced into the auxiliary chamber 200 through the communicating main chamber hole 110 and auxiliary chamber hole 210, thereby enabling the auxiliary chamber 200 to be deployed.

Meanwhile, in an embodiment disclosed herein, a diaphragm panel 300 may be connected to an inner surface of the main chamber 100 in a shape covering the chamber holes 110 and 210 through which the main chamber 100 and the auxiliary chamber 200 are in fluid communication with each other. A connecting rope 400 may be connected between the inner surface of the main chamber 100 facing the passenger and the diaphragm panel 300 so as to allow the chamber holes 110 and 210 to open by tension generated in the connecting rope 400.

As illustrated in FIG. 3, the diaphragm panel 300 may be sewn and fixed to the inner surface of the main chamber 100 to which the auxiliary chamber 200 is connected, and the diaphragm panel 300 may be configured to cover the chamber holes 110 and 210 formed in the main chamber 100 and the auxiliary chamber 200.

One end of a connecting rope 400 may be fixed to the diaphragm panel 300, and the opposite end of the connecting rope 400 may be fixed to the inner surface of the main chamber 100 facing the passenger.

Accordingly, in the initial stage of airbag deployment, the diaphragm panel 300 blocks the chamber holes 110 and 210 that provide fluid communication between the main chamber

100 and the auxiliary chamber 200, thereby preventing the gas being filled into the main chamber 100 from flowing into the auxiliary chamber 200.

Figure 9:
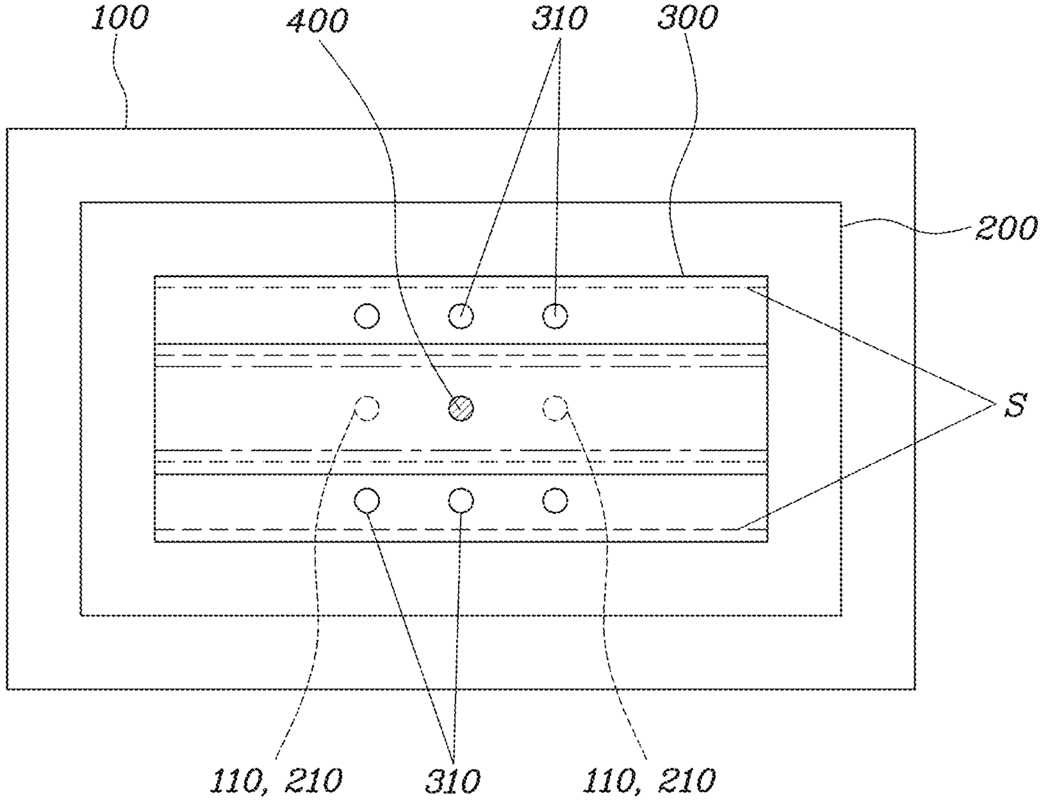
FIG. 9 is a view illustrating positions of panel holes and chamber holes according to some embodiments disclosed herein.

However, as illustrated in FIGS. 6 and 9, after the initial stage of airbag deployment, tension is generated in the connecting rope 400 by the deployment pressure of the gas being filled into the main chamber 100 during the deployment of the main chamber 100, and the connecting rope 400 pulls the diaphragm panel 300 toward the passenger.

Accordingly, the diaphragm panel 300 is separated from the inner surface of the main chamber 100, and the chamber holes 110 and 210 are opened, allowing the gas inside the main chamber 100 to flow into the auxiliary chamber 200 and the auxiliary chamber 200 to be deployed.

In addition, the diaphragm panel 300 includes a panel hole 310 so as to allow the gas in the main chamber 100 to pass through the panel hole 310 and flow into the chamber holes 110 and 210.

As illustrated in FIGS. 5 and 9, a plurality of panel holes 310 may be formed in the diaphragm panel 300.

Accordingly, in the initial stage of airbag deployment, the diaphragm panel 300 is brought into close contact with the main chamber 100 to prevent the gas introduced into the main chamber 100 from passing through the diaphragm panel 300 and from flowing into the auxiliary chamber 200.

Figure 8:
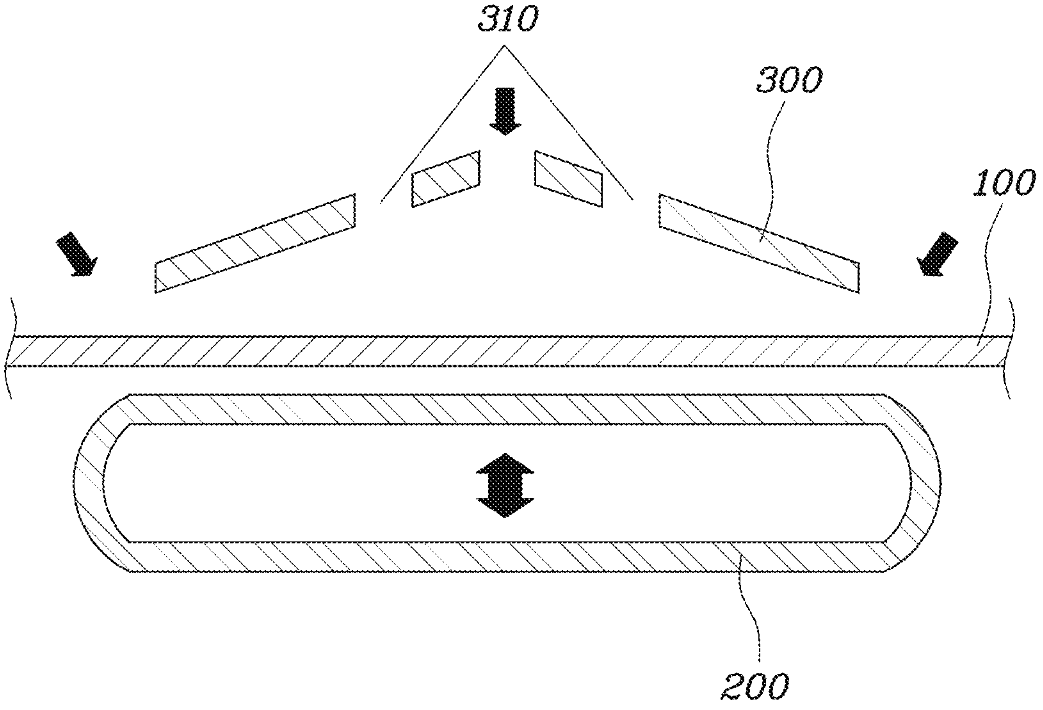
FIG. 8 is a cross-sectional view taken along line D-D in FIG. 6.

However, as illustrated in FIGS. 6 and 8, after the initial stage of airbag deployment, tension is generated in the connecting rope 400 by the deployment pressure of the gas being filled into the main chamber 100 during the deployment of the main chamber 100, and the connecting rope 400 pulls the diaphragm panel 300 toward the passenger.

Accordingly, as the diaphragm panel 300 is spaced apart from the inner surface of the main chamber 100, the panel holes 310 are also spaced apart from the main chamber 100, allowing the gas inside the main chamber 100 to pass through the panel holes 310 and flow into the auxiliary chamber 200.

In addition, the panel holes 310 may be formed at positions that do not overlap the chamber holes 110 and 210.

Referring to FIG. 9, a plurality of panel holes 310 may be formed in upper and lower regions of the diaphragm panel 300 with respect to the center of the diaphragm panel 300.

Main chamber holes 110 and auxiliary chamber holes 210 may be respectively formed in the main chamber 100 and the auxiliary chamber 200 at positions corresponding to the center of the diaphragm panel 300.

Accordingly, in a state in which the diaphragm panel 300 remains folded, the panel holes 310 and the chamber holes 110 and 210 are formed at positions that do not overlap each other.

Accordingly, in the initial stage of airbag deployment, both the panel holes 310 and the chamber holes 110 and 210 remain closed. As a result, only the main chamber 100 is deployed while the auxiliary chamber 200 is not, promoting rapid deployment of the main chamber 100. After the initial stage of airbag deployment, both the panel holes 310 and the chamber holes 110 and 210 are opened, allowing the auxiliary chamber 200 to be deployed together with the main chamber 100.

In addition, in the disclosed embodiment, the diaphragm panel 300 may be temporarily attached in a folded state to the inner surface of the main chamber 100, and the temporarily attached portion S may be configured to be broken by tension generated in the connecting rope 400.

Referring to FIGS. 3 and 6, the diaphragm panel 300 may be temporarily attached by sewing at a folded portion while being in a folded state on the inner surface of the main chamber 100, and the temporary attachment portion S is sewn in such a manner that it is broken when a force a predetermined level or more is applied.

Accordingly, in the initial stage of airbag deployment, the panel holes 310 of the diaphragm panel 300 are brought into close contact with the inner surface of the main chamber 100 by the folding and temporary attachment structure, which more reliably prevents the gas inside the main chamber 100 from flowing through the panel holes 310.

However, as the expansion amount of the main chamber 100 increases and tension is generated in the connecting rope 400, the diaphragm panel 300 is pulled with a force of a predetermined level or more by the connecting rope 400, causing the temporary attachment portion S to be broken and the diaphragm panel 300 to be separated from the main chamber 100, so that the gas flows into the auxiliary chamber 200.

In addition, the diaphragm panel 300 may be temporarily attached to the main chamber 100 and the auxiliary chamber 200.

That is, since the diaphragm panel 300 is temporarily attached together with the main chamber 100 and the auxiliary chamber 200 that overlap the diaphragm panel 300, the auxiliary chamber 200 may be brought into close contact with the main chamber 100. As a result, even if a portion of the gas passes through the chamber holes 110 and 210 and flows into the auxiliary chamber 200 in the initial stage of airbag deployment, deployment of the auxiliary chamber 200 is prevented.

As described above, in the present disclosure, the avoidance space 100*a* is formed in the main chamber 100, in which the protruding AVN 40 is positioned, so as to accommodate the AVN 40 within the avoidance space 100*a*. As a result, the main chamber 100 is deployed without interfering with the AVN 40, allowing the cushion 10 to be deployed while avoiding interference with the AVN 40.

In addition, since the auxiliary chamber 200 is deployed while filling the space between the AVN 40 and the main chamber 100 within the avoidance space 100*a*, the main chamber 100 and the auxiliary chamber 200 form an integrated chamber, which satisfies the vehicle's crash performance and ensures safe protection of the passenger.

Although the present disclosure has been described and illustrated in conjunction with particular embodiments thereof, it will be apparent to those skilled in the art that various improvements and modifications may be made to the present disclosure without departing from the technical idea of the present disclosure defined by the appended claims.

What is claimed is:

1. An airbag comprising:

a main chamber configured to be deployed from a structure of a vehicle facing a seat toward a passenger seated on the seat and to define an avoidance space shaped to extend over an obstacle protruding upward from the structure;

an auxiliary chamber configured to deploy between the obstacle and the main chamber within the avoidance space;

a diaphragm panel that is connected to an inner surface of the main chamber shaped to cover chamber holes through which the main chamber and the auxiliary chamber are in fluid communication with each other; and a connecting rope that is connected between the inner surface of the main chamber facing the passenger and the diaphragm panel so as to allow the chamber holes to open by tension generated in the connecting rope.

2. The airbag of claim 1, wherein the avoidance space is formed in a groove shape with a lower portion of the main chamber being open, and is configured to provide a clearance above and behind the obstacle.

3. The airbag of claim 1, wherein the auxiliary chamber is connected to an inner surface of the avoidance space facing the obstacle to be deployed toward the obstacle.

4. The airbag of claim 1, wherein the obstacle is positioned in an inner front portion of the avoidance space close to a deployment point of the main chamber, and wherein the auxiliary chamber is configured to be deployed toward the obstacle from an inner rear portion of the avoidance space close to the passenger.

5. The airbag of claim 1, wherein the auxiliary chamber is configured to be deployed in a shape configured to fill the avoidance space formed between the obstacle and the main chamber.

6. The airbag of claim 1, wherein the auxiliary chamber is folded on the inner surface of the avoidance space.

7. The airbag of claim 1, wherein the main chamber and the auxiliary chamber are in fluid communication with each other, so that a gas filled in the main chamber flows into the auxiliary chamber.

8. The airbag of claim 1, wherein the diaphragm panel comprises panel holes so as to allow a gas in the main chamber to pass through the panel hole and to flow into the chamber holes.

9. The airbag of claim 8, wherein the panel holes are formed at positions that do not overlap the chamber holes.

10. The airbag of claim 1, wherein the diaphragm panel is temporarily attached in a folded state to the inner surface of the main chamber, and wherein the temporarily attached portion is configured to be broken by tension generated in the connecting rope.

11. The airbag of claim 1, wherein the diaphragm panel is temporarily attached to the main chamber and the auxiliary chamber.

12. An airbag comprising:

a main chamber configured to deploy from a structure of a vehicle toward a passenger seated on a seat of the vehicle;

an auxiliary chamber configured to deploy between an obstacle protruding upward from the structure and the main chamber within an avoidance space;

a diaphragm panel connected to an inner surface of the main chamber and covering a plurality of chamber holes that place the main chamber and the auxiliary chamber in fluid communication with each other; and a connecting rope connected between the inner surface of the main chamber facing the passenger and the diaphragm panel, the connecting rope being tensioned by gas pressure generated inside the main chamber during deployment of the main chamber so as to separate the diaphragm panel from the inner surface and thereby expose the chamber holes and allow inflation gas in the main chamber to flow into the auxiliary chamber after an initial stage of airbag deployment.

13. The airbag of claim 12, wherein one end of the connecting rope is fixed to the diaphragm panel, and an opposite end of the connecting rope is fixed to the inner surface of the main chamber facing the passenger.

14. The airbag of claim 12, wherein tension in the connecting rope is generated by internal gas pressure of the main chamber during deployment of the main chamber.

15. The airbag of claim 12, wherein the connecting rope is oriented so as to pull the diaphragm panel toward the passenger when the tension is generated.

16. The airbag of claim 12, wherein the connecting rope separates the diaphragm panel from the inner surface of the main chamber to create a gap through which the gas inside the main chamber flows into the auxiliary chamber.

17. The airbag of claim 12, wherein the connecting rope is configured to apply a force of at least a predetermined level that breaks a temporary attachment portion that temporarily secures the diaphragm panel to the main chamber.

18. The airbag of claim 12, wherein the diaphragm panel is temporarily attached in a folded state on the inner surface of the main chamber, and the connecting rope pulls the diaphragm panel out of the folded state when the predetermined force is reached.

19. The airbag of claim 16, wherein, after the diaphragm panel is separated from the inner surface by the connecting rope, panel holes formed in the diaphragm panel are spaced apart from the inner surface so that gas passes through the panel holes and the chamber holes and flows into auxiliary chamber.

* * * * *